(12) United States Patent
Nanjundaswamy et al.

(10) Patent No.: US 6,878,489 B2
(45) Date of Patent: Apr. 12, 2005

(54) LITHIUM CELL WITH IMPROVED CATHODE

(75) Inventors: Kirakodu S. Nanjundaswamy, New Milford, CT (US); Francis Wang, Newtown, CT (US); Jiayu Simon Xue, Brookfield, CT (US); Fan Zhang, Danbury, CT (US); Ignacio Chi, Southbury, CT (US); Cahit Eylem, New Fairfield, CT (US)

(73) Assignee: The Gillette Company, Boston, MA (US)

( * ) Notice: Subject to any disclaimer, the term of this patent is extended or adjusted under 35 U.S.C. 154(b) by 221 days.

(21) Appl. No.: 10/139,555

(22) Filed: May 6, 2002

(65) Prior Publication Data

US 2003/0211392 A1 Nov. 13, 2003

(51) Int. Cl.[7] ........................ H01M 4/34; H01M 4/50; H01M 4/54
(52) U.S. Cl. ................. 429/219; 429/220; 429/231.95; 429/224; 429/232
(58) Field of Search ................................ 429/219, 220, 429/231.95, 224, 232

(56) References Cited

U.S. PATENT DOCUMENTS

| | | |
|---|---|---|
| 4,707,421 A | 11/1987 | McVeigh |
| 5,698,176 A | 12/1997 | Capparella |
| 6,753,109 B1 * | 6/2004 | Nanjundaswamy et al. . 429/219 |
| 6,759,166 B1 * | 7/2004 | Wang et al. ................. 429/219 |

OTHER PUBLICATIONS

PCT International Search Report for PCT/US 03/13961, Jan. 20, 2004.*
Linden. Handbook of Batteries, 2nd edition, pp. 7.11–7.13, 10.5 and 14.48–14.51. 1995 (no month).*
Claude Delmas, "Intercalation In Oxides", Chem. Phys. Intercalation,, vol. 172, p. 209 (1987), no month.
Yves Chabre, "Electrochemical Spectroscopy and In–Situ Diffraction Studies of Intercalation Compounds", Chemical Physics of Intercalation II, vol. 305, p. 181 (1982), no month.
K. Adelsberger, J. Curda, S. Vensky, M. Jansen, Journal of Solid State Chemistry, vol. 158, p. 82–86 (2001), no month.
J. Curda, W. Klein, and M. Jansen, Journal of Solid State Chemistry, vol. 162, p. 220–224 (2001), no month.

* cited by examiner

Primary Examiner—Tracy Dove
(74) Attorney, Agent, or Firm—Barry D. Josephs; Thomas G. Krivulka

(57) ABSTRACT

A primary lithium cell having an anode comprising lithium and a cathode comprising electrochemically active material selected from silver copper oxides having the formula $AgCuO_2$ or $Ag_2Cu_2O_3$ or mixtures thereof. The cathode can include a manganese dioxide in admixture with said silver copper oxides. The cell exhibits higher capacity and energy output than conventional lithium cells having an anode comprising lithium and cathode comprising manganese dioxide.

16 Claims, 1 Drawing Sheet

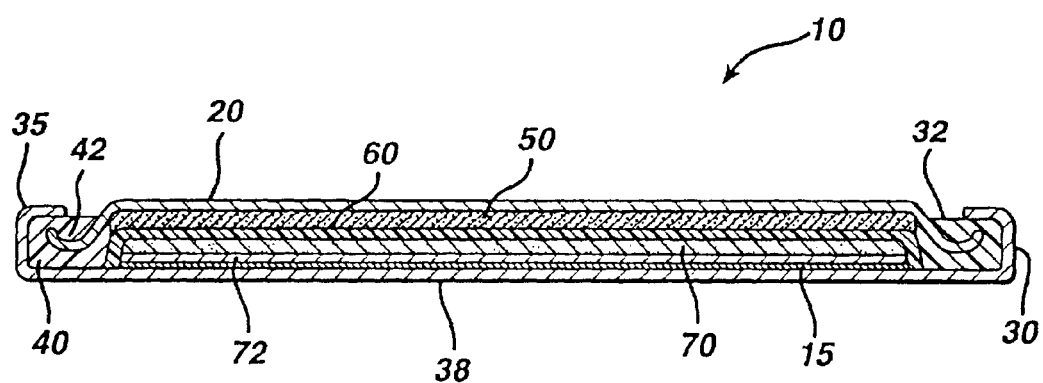

LITHIUM CELL WITH IMPROVED CATHODE

FIELD OF THE INVENTION

This invention relates to a lithium electrochemical cell with a cathode comprising silver copper oxide, $AgCuO_2$ or $Ag_2Cu_2O_3$, and mixtures thereof.

BACKGROUND OF THE INVENTION

Electrochemical cells commonly contain a negative electrode (anode) and a positive electrode (cathode), an electrolyte permeable separator therebetween and an electrolyte in contact with both of the electrodes. Electrolytes can be aqueous-based or non-aqueous organic solvent-based liquid electrolytes or polymeric electrolytes. There are two basic types of electrochemical cells, a primary (nonrechargeable) and a secondary (rechargeable) cell. A primary electrochemical cell is discharged to exhaustion only once. A secondary electrochemical cell, however, is rechargeable and thus can be discharged and recharged multiple times.

Primary (non-rechargeable) lithium cells have an anode comprising lithium and a cathode comprising manganese dioxide, and electrolyte comprising a lithium salt such as lithium trifluoromethane sulfonate ($LiCF_3SO_3$) dissolved in a mixtures of nonaqueous solvents. These lithium cells ($Li/MnO_2$ cells) are commonly in the form of button (coin shaped) cells, prismatic or polyhedral cells (wherein one or more of the housing surfaces are flat, typically of cuboid, namely, rectangular parallelepiped shape) or cylindrical cells, e.g. ⅔ A cell having about ⅔ the height of conventional AA alkaline cells. (The ⅔ A cell has an IEC designation "CR17335" and has a diameter of about 15 mm and height of about 32 mm). The $Li/MnO_2$ cells have a voltage of about 3.0 volts which is twice that of conventional $Zn/MnO_2$ alkaline cells and also have a higher energy density (watt-hours per cubic centimeter of cell volume) than that of alkaline cells. (Alkaline cells as referenced herein shall be understood to be conventional commercial alkaline cells having an anode comprising zinc, a cathode comprising manganese dioxide, and an electrolyte comprising aqueous potassium hydroxide.) Therefore, $Li/MnO_2$ cells can be used in compact electronic equipment, especially photographic cameras, which require operation at higher voltage and at higher power demand than individual alkaline cells.

Primary lithium electrochemical cells typically employ an anode of lithium metal or lithium alloy, preferably a lithium-aluminum alloy; a cathode containing an electrochemically active material consisting of a transition metal oxide or chalcogenide, preferably manganese dioxide; and an electrolyte containing a chemically stable lithium salt dissolved in an organic solvent or a mixture of organic solvents. (The term "anode active material" or "cathode active material" as used herein shall be understood to mean material in the anode or cathode, respectively, which undergoes useful electrochemical reaction during cell discharge, contributing to the cell's capacity and voltage.)

The lithium anode is preferably formed from a sheet or foil of lithium metal or lithium alloy without any substrate or lithium metal deposited or coated on a metallic substrate such as copper or other metals. A lithium primary cell referenced hereinafter as having an anode comprising "lithium" shall be understood to mean an anode of lithium metal or a lithium alloy. If a lithium-aluminum alloy is employed, the aluminum is present in a very small amount, typically less than about 1 wt % of the alloy. The addition of aluminum primarily serves to improve the low temperature performance of the lithium anode in lithium primary cells.

Manganese dioxides suitable for use in lithium primary cells include both chemically produced manganese dioxide known as "chemical manganese dioxide" or "CMD" and electrochemically produced manganese dioxide known as "electrolytic manganese dioxide" or "EMD". CMD can be produced economically and in high purity, for example, by the methods described by Welsh et al. in U.S. Pat. No. 2,956,860. However, CMD typically does not exhibit energy or power densities in lithium cells comparable to those of EMD. Typically, EMD is manufactured commercially by the direct electrolysis of a bath containing manganese sulfate dissolved in a sulfuric acid solution. Processes for the manufacture of EMD and representative properties are described in "Batteries", edited by Karl V. Kordesch, Marcel Dekker, Inc., New York, Vol. 1, 1974, pp.433–488. Manganese dioxide produced by electrodeposition typically is a high purity, high density, "gamma($\gamma$)-$MnO_2$" phase, which has a complex crystal structure containing irregular intergrowths of a "ramsdellite"-type $MnO_2$ phase and a smaller portion of a beta($\beta$)- or "pyrolusite"-type $MnO_2$ phase as described by deWolfe (*Acta Crystallographica*, 12, 1959, pp.341–345). The gamma($\gamma$)-$MnO_2$ structure is discussed in more detail by Burns and Burns (e.g., in "Structural Relationships Between the Manganese (IV) Oxides", *Manganese Dioxide Symposium*, 1, The Electrochemical Society, Cleveland, 1975, pp. 306–327).

Electrochemical manganese dioxide (EMD) is the preferred manganese dioxide for use in primary lithium cells. However, before it can be used, it must be heat-treated to remove residual water. The term "residual water", as used herein includes surface-adsorbed water, noncrystalline water (i.e., water physisorbed or occluded in pores), as well as lattice water. Heat-treatment of EMD prior to its use in lithium cells is well known and has been described by Ikeda et al. (e.g., in "Manganese Dioxide as Cathodes for Lithium Batteries", *Manganese Dioxide Symposium*, Vol. 1, The Electrochemical Society, Cleveland, 1975, pp. 384–401).

EMD suitable for use in primary lithium cells can be heat-treated at temperatures between about 200 and 350° C. as taught by Ikeda et al. in U.S. Pat. No. 4,133,856. This reference also discloses that it is preferable to heat-treat the EMD in two steps. The first step is performed at temperatures up to about 250° C. in order to drive off surface and non-crystalline water. The EMD is heated in a second step to a temperature between about 250 and 350° C. to remove the lattice water. This two-step heat-treatment process improves the discharge performance of primary lithium cells, primarily because surface, non-crystalline, and lattice water are all removed. An undesirable consequence of this heat-treatment process is that EMD having the $\gamma$-$MnO_2$-type structure, is gradually converted to EMD having a gamma/beta ($\gamma/\beta$)-$MnO_2$-type structure. The term "gamma/beta-$MnO_2$" as used in the art reflects the fact (as described by Ikeda et al.) that a significant portion of the $\gamma$-$MnO_2$ (specifically, the ramsdellite-type $MnO_2$ phase) is converted to $\beta$-$MnO_2$ phase during heat-treatment. At least about 30 percent by weight and typically between about 60 and 90 percent by weight of the ramsdellite-type $MnO_2$ phase is converted to $\beta$-$MnO_2$ during conventional heat treatment of $\gamma$-$MnO_2$ as taught, for example, in U.S. Pat. No. 4,921,689. The resulting $\gamma/\beta$-$MnO_2$ phase is less electrochemically active than an EMD in which the $\gamma$-$MnO_2$ phase contains a higher fraction of ramsdellite-type $MnO_2$ relative to $\beta$-$MnO_2$. Thackeray et al. have disclosed in U.S. Pat. No.

5,658,693 that cathodes containing such β-$MnO_2$-enriched phases exhibit less capacity for lithium uptake during discharge in lithium cells.

One consequence of the electrodeposition process used to prepare EMD is that the formed EMD typically contains "residual surface acidity" from the sulfuric acid of the electrolytic bath. This "residual surface acidity" must be neutralized, for example, with basic aqueous solution, before the EMD can be used in cathodes for primary lithium cells. Suitable aqueous bases include: sodium hydroxide, ammonium hydroxide (i.e., aqueous ammonia), calcium hydroxide, magnesium hydroxide, potassium hydroxide, lithium hydroxide, and combinations thereof. Typically, commercial EMD is neutralized with a strong base such as sodium hydroxide because it is highly effective and economical.

An undesirable consequence of the acid neutralization process is that alkali metal cations can be introduced into ion-exchangeable sites on the surface of the EMD particles. For example, when sodium hydroxide is used for acid neutralization, sodium cations can be trapped in the surface sites. This is especially undesirable for EMD used in cathodes of primary lithium cells because during cell discharge the sodium cations can be released into the electrolyte, deposit onto the lithium anode, and degrade the lithium passivating layer. Further, the deposited sodium cations can be reduced to sodium metal, react with the organic electrolyte solvents, and generate gas, thereby substantially decreasing the storage life of the cells.

A process for converting commercial grade EMD that has been neutralized with sodium hydroxide to the lithium neutralized form is disclosed by Capparella et al. in U.S. Pat. No. 5,698,176 and related Divisional U.S. Pat. No. 5,863,675. The disclosed process includes the steps of: (a) mixing sodium hydroxide neutralized EMD with an aqueous acid solution to exchange the sodium cations with hydrogen ions and produce an intermediate with reduced sodium content; (b) treating the intermediate with lithium hydroxide or another basic lithium salt to exchange the hydrogen ions with lithium cations; (c) heat-treating the lithium ion-exchanged EMD at a temperature of at least about 350° C. to remove residual water. However, Capparella et al. disclose that "contacting particulate EMD with high pH lithium hydroxide solution may also serve to introduce lithium ions into the crystal lattice of the $MnO_2$, thereby altering the crystal structure into a form which is not useful as a cathode active material". Further, Capparella et al. specifically teach against treatment of an aqueous suspension of EMD with lithium hydroxide to a final pH greater than 7.5 since such treatment was disclosed to destroy EMD particle integrity and produce sub-micron size $MnO_2$ particles that were difficult to process.

In place of manganese dioxide a lithiated manganese dioxide can be used as the cathode active material for primary lithium cells. A method for preparing a lithiated manganese dioxide and its use in primary lithium cells as cathode active material in primary lithium cells is described in U.S. Pat. No. 6,190,800. The lithiated manganese dioxide recited in this reference is a heat treated lithiated manganese dioxide product having the formula $Li_yMnO_{2-\delta}$, wherein $0.075 \leq y \leq 0.175$ and $0.01 \leq \delta \leq 0.06$, and a predominantly gamma(γ)-$MnO_2$-type crystal structure.

Thus, as evidenced by the cited prior art, the methods used to prepare active cathode materials comprising manganese dioxide or lithiated manganese dioxide suitable for cathodes in a primary lithium cells require additional refinement in order to substantially improve performance of the lithium cells incorporating such active cathode materials.

SUMMARY OF THE INVENTION

A principal aspect of the invention is directed to a primary (nonrechargeable) lithium cell having an anode comprising lithium, a non-aqueous electrolyte, and a cathode comprising $AgCuO_2$ or $Ag_2Cu_2O_3$ as cathode active material. The $AgCuO_2$ or $Ag_2Cu_2O_3$ can be used as cathode active material alone or in any admixture thereof. The $AgCuO_2$ can be used in admixture with $MnO_2$ in any mixture thereof to form the cathode active material for the lithium cell. It shall be understood that a portion of the $MnO_2$ in this case can be in the form of a manganese dioxide such as lithiated manganese dioxide or all of the $MnO_2$ can be in the form of a lithiated manganese dioxide. The $MnO_2$ is preferably heat treated to remove residual water. (The term "a manganese dioxide" shall be understood to include $MnO_2$ and lithiated manganese dioxide.) The lithiated manganese dioxide, for example, as referenced above and hereinafter can have the formula $Li_yMnO_{2-\delta}$, wherein $0.075 \leq y \leq 0.175$ and $0.01 \leq \delta \leq 0.06$ recited in U.S. Pat. No. 6,190,800. Alternatively, the $Ag_2Cu_2O_3$ if employed as cathode active material can be used in admixture with $MnO_2$ in any mixture thereof to form the cathode active material for the lithium cell. In such case it shall be understood that a portion of the $MnO_2$ or all of the $MnO_2$ present in the cathode can be in the form of a lithiated manganese dioxide, for example, a lithiated manganese dioxide having the formula $Li_yMnO_{2-\delta}$, wherein $0.075 \leq y \leq 0.175$ and $0.01 \leq \delta \leq 0.06$ as recited in U.S. Pat. No. 6,190,800.

Also, the cathode active material for the lithium cell can comprise mixtures of $AgCuO_2$, $Ag_2Cu_2O_3$, and $MnO_2$. All or a portion of the $MnO_2$ in such mixtures can be in the form of a lithiated manganese dioxide. It will be appreciated that the $MnO_2$ is desirably heat treated to remove residual water thereby making it more suitable for use as cathode active material in the lithium cell. A conductive carbon, preferably graphite such as natural, or synthetic graphite, preferably expanded graphite, is added to the cathode mixture to improve conductivity.

It has been determined that the primary lithium cell of the invention can comprise a conventional anode, namely, a sheet of lithium or lithium alloy, e.g. lithium-aluminum alloy, preferably, comprising at least 99 percent by weight lithium. The cell may be in the form of a button cell or a spirally wound cell. The electrolyte can be non-aqueous electrolyte, conventionally used in primary lithium cells having a lithium anode and $MnO_2$ cathode. For example, by way of non-limiting example, the electrolyte can be a lithium salt, such as lithium perchlorate ($LiClO_4$) or lithium trifluoromethylsulfonate ($LiCF_3SO_3$) dissolved in an organic solvent, for example, ethylene carbonate (EC) and propylene carbonate (PC). Gel type polymer electrolytes used in conventional lithium-ion rechargeable cells could also be suitable. The separator can be selected from conventional separators for primary lithium cells, for example, the separator can be of microporous polypropylene.

When $AgCuO_2$ is used as cathode active material in admixture with a manganese dioxide the total cathode (fresh) for the lithium cell desirably comprises between about 1 and 20 percent by weight of $AgCuO_2$, preferably between about 3 and 10 percent by weight of the total cathode. In such mixture of $AgCuO_2$ and $MnO_2$, the $MnO_2$ comprises typically between about 50 and 80 percent by weight of the total cathode, more typically between about 60 and 70 percent by weight of the total cathode.

The copper in $AgCuO_2$ compound has a +3 valence and the silver a +1 valence. The $Cu^{+3}$ and $Ag^{+1}$ are available for reduction to copper metal and silver metal during discharge. As a result the $AgCuO_2$ has a high theoretical specific capacity, namely, 526 milliAmp-hour/g as calculated by Applicants of the present invention. This is much higher than the theoretical specific capacity of $MnO_2$, which is 308 milliAmp-hour/g. This can result in higher capacity. Additionally, the presence of monovalent silver ($Ag^{+1}$) and trivalent copper ($Cu^{+3}$) in the $AgCuO_2$ compound causes elevation in the cell's running voltage profile, as compared to divalent copper compounds such as CuO or AgO. The resulting "energy output" is higher when compared to conventional primary lithium cells having a lithium anode and $MnO_2$ cathode.

Similar advantageous results can be obtained if the cathode active material for the primary lithium cell of the invention comprises $Ag_2Cu_2O_3$ alone or in admixture with $MnO_2$, or alternatively if the cathode active material comprises mixtures of $AgCuO_2$, $Ag_2Cu_2O_3$ and $MnO_2$. If the $Ag_2Cu_2O_3$ is used in admixture with $MnO_2$ without any $AgCuO_2$ added then the total cathode (fresh) desirably comprises between about 1 and 20 percent by weight $Ag_2Cu_2O_3$. If the cathode comprises both $AgCuO_2$ and $Ag_2Cu_2O_3$ in admixture with a manganese dioxide, then the total amount of $AgCuO_2$ and $Ag_2Cu_2O_3$ is desirably between about 1 and 20 percent by weight of the total cathode.

BRIEF DESCRIPTION OF THE DRAWING

The FIGURE is a cross sectional view of a typical primary lithium electrochemical button cell.

DETAILED DESCRIPTION

A primary lithium electrochemical cell can be fabricated in the form of a button or coin cell 10 as shown in the FIGURE. The primary lithium cell can also be fabricated in the form of a wound cell, for example, as shown in U.S. Pat. No. 4,707,421, herein incorporated by reference. In the button cell shown in the FIGURE, a disk-shaped cylindrical housing 30 is formed having an open end 32 and a closed end 38. Housing 30 is preferably formed from nickel-plated steel, for example. An electrical insulating member 40, preferably a cylindrical member having a hollow core, is inserted into housing 30 so that the outside surface of insulating member 40 abuts and lines the inside surface of housing 30. Alternatively, the inside surface of housing 30 may be coated with a polymeric material that solidifies into insulator 40 abutting the inside surface of housing 30. Insulator 40 can be formed from a variety of thermally stable insulating materials, for example, nylon or polypropylene. A cathode current collector 15 comprising a metallic grid can be inserted into the cell so that it abuts the inside surface of the closed end 38 of the housing 30. The cathode current collector 15 can be welded onto the inside bottom of the closed end 38 of the housing 30. An optional conductive layer 72 comprising a mixture of graphite and polytetrafluoroethylene (PTFE) binder can be compressed into the cathode current collector 15.

A layer of cathode material 70 of the invention comprising $AgCuO_2$ or $Ag_2Cu_2O_3$ or any mixture thereof as active cathode material, is inserted over optional conductive layer 72 overlying cathode current collector 15. The cathode material 70 can be composed entirely of $AgCuO_2$ cathode active material. Alternatively, cathode material 70 can comprise mixtures of $AgCuO_2$ and manganese dioxide or mixtures of $AgCuO_2$ and lithiated manganese dioxide as well as mixtures of $AgCuO_2$, manganese dioxide and lithiated manganese dioxide as the cathode active material therein. The lithiated manganese dioxide, for example, can have the form as above referenced in U.S. Pat. No. 6,190,800, herein incorporated by reference. Alternatively, the cathode material 70 can be composed entirely of $Ag_2Cu_2O_3$ cathode active material or entirely of mixtures $AgCuO_2$ and $Ag_2Cu_2O_3$ cathode active material.

Cathodes 70 can be formed of mixtures of $Ag_2Cu_2O_3$ and manganese dioxide or mixtures of $Ag_2Cu_2O_3$ and lithiated manganese dioxide. In such latter mixtures $AgCuO_2$ can also be added. (If manganese dioxide is used in admixture with the $Ag_2Cu_2O_3$ it shall be understood to preferably be heat treated manganese dioxide to remove residual water.) In the absence of the conductive layer 72, the layer of cathode material 70 is compressed into cathode current collector 15. A separator sheet 60 is placed overlying cathode layer 70. Nonaqueous electrolyte is added so that it fully penetrates through separator sheet 60 and cathode layer 70. A layer of anode material 50, typically lithium or lithium alloy is placed over separator sheet 60. The anode cover 20, formed preferably from nickel-plated steel, is inserted into open end 32 of housing 30 and peripheral edge 35 of housing 30 is crimped over the exposed insulator edge 42 of insulating member 40. The peripheral edge 35 bites into insulator edge 42 closing housing 30 and tightly sealing the cell contents therein. The anode cover 20 also functions as the negative terminal of the cell and housing 30 at the closed end 38 functions as the positive terminal of the cell.

Alternatively, a primary lithium cylindrical cell can be fabricated comprising a spirally wound anode and cathode with a separator sheet positioned therebetween. This electrode configuration for primary lithium cells is well known in the art and an embodiment thereof is described in detail, for example, in U.S. Pat. No. 4,707,421. Compositions for the electrodes, separator, and electrolyte as disclosed in U.S. Pat. No. 4,707,421, herein incorporated by reference, can be used for the primary lithium cells of the present invention except that the cathode comprises $AgCuO_2$ or $Ag_2Cu_2O_3$ or mixtures thereof which can include a manganese dioxide added thereto as above referenced.

The $AgCuO_2$ can be prepared by the reaction between a silver nitrate ($AgNO_3$) and copper nitrate [$Cu(NO_3)_2$] utilizing a catalyst such as $K_2S_2O_8$ with the reaction carried out at about 90° C. temperature. A method of synthesis according to the above reaction is described in Curda, W. Klein, and M. Jansen, "$AgCuo_2$ Synthesis, Crystal Structure and structural relationships with CuO and $AgO_2$,", *Journal of Solid State Chemistry*, Vol. 162, pp. 220–224 (2001). Specifically, as stated in this reference, microcrystalline $AgCuO_2$, can be synthesized by reaction of saturated aqueous solution of 1.205 g (5 mMol) of $AgNO_3$ (Merck, 99%) and 0.85 g (5 mMol) of $Cu(NO_3)_2 \cdot 3H_2O$ by adding a solution of 3.0 g of KOH and 1.5 g of $K_2S_2O_8$ in 150 ml of water at 90° C. The microcrystalline $AgCuO_2$ forms as a precipitate. The unique microcrystalline structure of the $AgCuO_2$ is illustrated in FIG. 6 of said reference. The $AgCuO_2$ precipitate is filtered off, washed with deionized water and dried in air at 70° C. Another means of forming $AgCuO_2$ (alluded to in Curda, supra, at p. 220) is by oxidation of an aqueous suspension of $Ag_2Cu_2O_3$ as reported in the reference K. Adelsberger, J. Curda, S. Vensky, and M. Jansen, *J. Solid State Chem.*, Vol. 158, p. 82 (2001).

The $AgCuO_2$ prepared by either method can be used in cathode 70 of the invention. The $AgCuO_2$ used in cathode 70 is a powder having an average particle size (dry) desirably between about 1 and 100 micron. The $AgCuO_2$ has a theoretical capacity of about 526 mAmp-hours/g as calculated by Applicants of the present inventon. The $AgCuO_2$ has a BET surface area of about 8.35 $m^2$/g for particle sizes between about 1 and 100 micron. The BET surface area ($m^2$/g) (Brunauer, Emmett and Taylor method) is the standard measurement of particulate surface area by gas (nitrogen and/or other gases) porosimetry as is recognized in the art. The BET test is carried out in accordance with ASTM Standard Test Method D4820-99. The BET surface area measures the total surface area on the exterior surface of the particles and pores within the particles. Typical other physical properties of the $AgCuO_2$ are as follows: density, 7.10 g/$cm^3$; BET surface area, 8.35 $m^2$/g; mean particle size, approximately 10 Angstrom; total intraparticle pore volume (pore volume within the particles) 0.0826 $cm^3$/g; average pore diameter 395 Angstrom; resistivity, 7–12 ohm-cm.

The alternative form of silver copper oxide, namely, $Ag_2Cu_2O_3$ for use as cathode active material in cathode 70 of the invention can be made as described in K. Adelsberger, J. Curda, S. Vensky, and M. Jansen, *J. Solid State Chem.*, Vol. 158, p. 82 (2001). The $Ag_2Cu_2O_3$ has a theoretical capacity of about 411 mAh/g as calculated by Applicants of the present invention. A method of preparing $Ag_2Cu_2O_3$ is given in K. Adelsberger, et. al., supra, J. Solid State Chem., Vol. 158, at p. 82, as follows: "Black crystals of $Ag_2Cu_2O_3$ can be prepared by solid state reaction of $Ag_2O$ (precpitated from an acidic $AgNO_3$ solution) and CuO (Adrich, 99%) in a high oxygen pressure. The binary oxides can be mixed in a 1:1 molar ratio and then annealed for 3–5 days in silver crucibles placed in stainless steel autoclaves. The optimized reaction temperature and oxygen pressure are 500° C. and 200 MPa, respectively. One milliliter of a 7 M KOH aqueous solution is added as an accelerator. Microcrystalline, black powder of $Ag_2Cu_2O_3$ is precipitated from an aqueous solution of $AgNO_3$ (Merck, p.a., 99.5%) and $CuNO_3.3H_2O$ (Panreac, p.a., 99.98%) adding 4 ml NaOH solution (3M). The precipitate is dried in air at 90° C. for 24 hours." Typical other physical properties of the $Ag_2Cu_2O_3$ are as follows: density, 7.00 g/$cm^3$; BET surface area, 8.07 $m^2$/g; mean particle size, approximately 11.6 Angstrom; total intraparticle pore volume (pore volume within the particles) 0.118 $cm^3$/g; average pore diameter 583 Angstrom; resistivity, 7–12 ohm-cm.

The cathode 70 for the primary lithium cell of the invention consists of a cathode active material mixed with suitable polymeric binders, for example, polytetrafluoroethylene, and conductive agents, for example, carbon black and graphite, to produce a cathode paste or slurry. The cathode paste can be applied to current collector 15 comprising a highly porous sintered, felted, or foamed electrically-conductive substrate, for example, a stainless steel grid, an expanded metal foam or a metal foil. The cathode active material in cathode 70 can comprise the $AgCuO_2$ or $Ag_2Cu_2O_3$ alone or in any mixtures thereof. Manganese dioxide or lithiated manganese dioxide can be added in any percent by weight as additional cathode active material in admixture with the $AgCuO_2$ or $Ag_2Cu_2O_3$ cathode active material. (The manganese dioxide, if included as additional cathode active material is desirably conventional heat-treated manganese dioxide.) Cathode pieces of the appropriate size can be cut from the coated substrate.

The anode 50 comprises anode active material preferably of lithium or a lithium alloy. The anode 50 can be a solid sheet of lithium. The anode 50 is desirably formed of a continuous sheet of lithium metal (99.8 wt. % pure). Alternatively, anode 50 can be an alloy of lithium and an alloy metal, for example, an alloy of lithium and aluminum. An alloying metal, such as aluminum, can be present at a low concentration, typically less than 1 wt. %. Upon cell discharge the lithium in the alloy functions essentially as pure lithium. Thus, the term "lithium or lithium metal" as used herein and in the claims is intended to include such lithium alloy. The lithium sheet, forming anode 50 does not require a substrate. The lithium anode 50 is advantageously formed from an extruded sheet of lithium metal having a thickness of desirably between about 0.15 and 0.20 mm Alternatively, a much thicker lithium metal anode of about 0.75 mm thick could be used for test coin cells, for example, of the type referenced in the examples.

A separator layer 60 is located between the two electrodes. The separator layer typically consists of a porous polymer film or thin sheet that serves as a spacer and prevents electrical contact between the cathode and anode while allowing electrolyte to move freely through the pores. Suitable separators can include relatively non-reactive polymers such as, for example, microporous polypropylene, polyethylene, a polyamide (i.e., a nylon), a polysulfone, or polyvinyl chloride (PVC). The separator has a preferred thickness between about 10 microns and 200 microns and a more preferred thickness between about 20 microns and 50 microns.

The anode 50, cathode 70 and separator 60 therebetween are contained within housing 30. As described hereinabove, the cell can take the form of a coin cell, button cell, cylindrical cell, prismatic cell, laminar cell or other standard cell geometry. The housing 30 is closed to provide a gas-tight and fluid-tight seal. The housing 30 can be made of a metal such as nickel, nickel clad or plated steel, stainless steel, aluminum or a plastic material such as PVC, polypropylene, a polysulfone, an acrylic acid-butadiene-styrene terpolymer (ABS), or a polyamide. The housing 30 containing the electrodes and separator can be filled with a suitable liquid or a polymeric nonaqueous electrolyte.

The nonaqueous electrolyte can be any nonaqueous electrolyte or combination of nonaqueus electrolytes known in the art. Typically, nonaqueous electrolytes suitable for use in a primary lithium/$MnO_2$ cell comprise a lithium salt dissolved in an organic solvent or combination of organic solvents. Typically, the salt is lithium perchlorate ($LiClO_4$) or lithium trifluoromethylsulfonate ($LiCF_3SO_3$). Other suitable electrolyte salts include: $LiPF_6$, $LiAsF_6$, $LiBF_4$, lithium bis(trifluoromethylsulfonyl) imide ($Li(CF_3SO_2)_2N$), and lithium bis(perfluoroethylsulfonyl) imide ($Li(CF_3CF_2SO_2)_2N$) Suitable organic solvents include ethylene carbonate (EC), propylene carbonate(PC), butylene carbonate, and the like; dimethylcarbonate (DMC); diethyl carbonate (DEC), ethyl methyl carbonate (EMC), dimethoxyethane (DME); dioxolane; gamma($\gamma$)-butyrolactone; diglyme; and mixtures thereof. A preferred electrolyte composition consists of a 0.6 M solution of lithium trifluoromethylsulfonate ($CF_3SO_3Li$; available under the tradename, FC-122, from 3M) in a mixture of dry ethylene carbonate, propylene carbonate, and dimethoxyethane. Once filled with the nonaqueous electrolyte, the housing 30 is sealed to confine the nonaqueous electrolyte and to inhibit the infiltration of moisture and air into the cell.

The following examples illustrate the invention. Test cells were prepared and balanced so that capacity of the anode (based on a theoretical specific capacity of lithium of 3860 milliAmp-hr./g divided by the theoretical capacity of total cathode actives is about 1. The cathode theoretical capacity is calculated using the following theoretical specific capacities: $MnO_2$, 308 mAh/g; $AgCuO_2$, 526 mAh/g; and $Ag_2Cu_2O_3$, 411 mAh/g.

EXAMPLE 1

Comparative—Lithium Anode/MnO$_2$ Cathode

A button cell 10 is made in accordance with the above description. The button cell 10 was a standard 2430 size having the overall dimensions 24.47 mm diameter and 2.46 mm thickness. The anode material 50 was as above described comprising a sheet of lithium (99.8 wt. % pure). The anode 50 had a weight of ~115 mg. In the test cells slight excess Li weight was used in determining the specific capacity of cathode active material and also to fill up the void volume inside the cells. The separator 60 was of microporous polypropylene membrane of basis weight between about 13.5 and 16.5 g/m$^2$ and about 0.025 mm thick.

Cathode 70 has the following formulation: manganese dioxide (electrolytic manganese dioxide, EMD), 70.0 wt. %, tetrafluoroethylene (Teflon polymer), 3.0 wt. %, conducting carbon additive 27 wt. % (mixtures of Shawinigan carbon black and particulate graphite such as expanded graphite from Timcal Group in different ratios). The manganese dioxide was heat treated in conventional manner to remove residual water (non-crystalline water) therefrom before the cathode coating 70 was prepared. The cathode 70 can be prepared by mixing the above components in a conventional electric blender at room temperature until a homogenous mixture is obtained. The cathode mixture 70 can be coated on one side of the cathode current collector 15. The cathode current collector was a stainless steel expanded metal foil (EXMET stainless steel foil) having a basis weight of about 0.024 g/cm$^3$. After the anode 50 and cathode 70 is inserted with separator 60 the housing 30 is filled with the above described electrolyte consisting of a 0.6 M solution of lithium trifluoromethylsulfonate (CF$_3$SO$_3$Li; available under the tradename, FC-122, from 3M) in a mixture of dry ethylene carbonate, propylene carbonate, and dimethoxyethane. Cell 10 was then sealed as above described.

| Cathode Composition, wt. % | |
|---|---|
| MnO$_2$ | 70.0 |
| Tetrafluoroethylene Teflon polymer | 3.0 |
| Particulate graphite | 27.0 |
| Total | 100.0 |

Fresh cells 10 were discharged at a constant current of 3 milliAmp and 10 milliAmp to a cut off of 1.5 volts. The 3 mA and 10 mA rate in the button cell corresponds to a rate of about 30 mA/g and 100 mA/g, respectively, of the cathode active material. (Also 3 milliAmp rate in the above button cell corresponds to approximately a ~200 milliAmp rate for a ⅔ A cell and the 10 milliAmp rate corresponds to approximately a ~675 milliAmp rate for a ⅔ A cell). The cells specific capacity for actives (mAmp-hours/g) and energy output for total cathode actives (mWatt-hours/g), (mWatt-hours/cc) is reported in Table 1 for discharge at 3 milliamp and Table 2 for discharge at 10 milliamp.

EXAMPLE 2

Lithium Anode/AgCuO$_2$ Cathode

A button cell 10 is made as in Example 1 employing the same size cell, same anode, same electrolyte and components, except that the cathode compositon was changed to employ AgCuO$_2$ as cathode active material.

Cathode 70 has the following formulation: AgCuO$_2$, 70 wt. %; particulate graphite (expanded graphite from Timcal Group), 27 wt. %; tetrafluoroethylene (Teflon) binder, 3 wt. %. The cathode 70 can be prepared by mixing the above components in a conventional electric blender at room temperature until a homogenous mixture is obtained. The cathode mixture 70 can be coated on one side of the cathode current collector 15. The cathode current collector was a stainless steel expanded metal foil (EXMET stainless steel foil) having a basis weight of about 0.024 g/cm$^3$. The cathode composition is summarized as follows:

| Cathode Composition, wt. % | |
|---|---|
| AgCuO$_2$ | 70.0 |
| Tetrafluoroethylene Teflon polymer | 3.0 |
| Particulate graphite | 27.0 |
| Total | 100.0 |

Fresh cells 10 were discharged at a constant current of 3 milliAmp and 10 milliAmp to a cut off of 1.5 volts. The cells specific capacity for actives (mAmp-hours/g) and energy output for total cathode actives (mWatt-hours/g), (mWatt-hours/cm$^3$) is reported in Table 1 for discharge at 3 milliamp and Table 2 for discharge at 10 milliamp.

EXAMPLE 3

Lithium Anode/Ag$_2$Cu$_2$O$_3$ Cathode

A button cell 10 is made as in Example 1 employing the same size cell, same anode, same electrolyte and components, except that the cathode composition was changed to employ Ag$_2$Cu$_2$O$_3$ as cathode active material.

Cathode 70 has the following formulation: Ag$_2$Cu$_2$O$_3$, 70 wt. %; particulate graphite (expanded graphite from Timcal Group), 27 wt. %; tetrafluoroethylene (Teflon) binder, 3 wt. %. The cathode 70 can be prepared by mixing the above components in a conventional electric blender at room temperature until a homogenous mixture is obtained. The cathode mixture 70 can be coated on one side of the cathode current collector 15. The cathode current collector was a stainless steel expanded metal foil (EXMET stainless steel foil) having a basis weight of about 0.024 g/cm$^3$. The cathode composition is summarized as follows:

| Cathode Composition, wt. % | |
|---|---|
| Ag$_2$Cu$_2$O$_3$ | 70.0 |
| Tetrafluoroethylene Teflon polymer | 3.0 |
| Particulate graphite | 27.0 |
| Total | 100.0 |

Fresh cells 10 were discharged at a constant current of 3 milliAmp and 10 milliAmp to a cut off of 1.5 volts. (The 3 milliAmp rate corresponds to approximately a 200 milliAmp rate for a ⅔ A cell and the 10 milliAmp rate corresponds to approximately a 675 milliAmp rate for a ⅔ A cell.) The cells cathode active material's specific capacity (mAmp-hours/g), energy output (mWatt-hours/g), and energy density (mWatt-hours/cc) is reported in Table 1 for discharge at 3 milliamp and Table 2 for discharge at 10 milliamp.

EXAMPLE 4

Lithium Anode/AgCuO$_2$+MnO$_2$ Cathode

A button cell 10 is made as in Example 1 employing the same size cell, same anode, same electrolyte and components, except that the cathode composition was changed to employ AgCuO$_2$ in admixture with MnO$_2$ as cathode active material.

Cathode 70 has the following formulation: AgCuO$_2$, 3 wt. % MnO$_2$, 67 wt. %; particulate graphite (expanded graphite from Timcal Group), 27 wt. %; tetrafluoroethylene (Teflon) binder, 3 wt. %. The MnO$_2$ was heat treated to remove residual water before use in the cathode. The cathode 70 can be prepared by mixing the above components in a conventional electric blender at room temperature until a homogenous mixture is obtained. The cathode mixture 70 can be coated on one side of the cathode current collector 15. The cathode current collector was a stainless steel expanded metal foil (EXMET stainless steel foil) having a basis weight of about 0.024 g/cm$^3$. The cathode composition is summarized as follows:

| Cathode Composition, wt. % | |
|---|---|
| AgCuO$_2$ | 3.0 |
| MnO2 | 67.0 |
| Tetrafluoroethylene Teflon polymer | 3.0 |
| Particulate graphite | 27.0 |
| Total | 100.0 |

Fresh cells 10 were discharged at a constant current of 3 milliAmp and 10 milliAmp to a cut off of 1.5 volts. The cells cathode active material's specific capacity (mAmp-hours/g), energy output (mWatt-hours/g), and energy density (mWatt-hours/cc) is reported in Table 1 for discharge at 3 milliamp and Table 2 for discharge at 10 milliamp.

EXAMPLE 5

Lithium Anode/AgCuO$_2$+MnO$_2$ Cathode

A button cell 10 is made as in Example 1 employing the same size cell, same anode, same electrolyte and components, except that the cathode composition was changed to employ AgCuO$_2$ in admixture with MnO$_2$ as cathode active material.

Cathode 70 has the following formulation: AgCuO$_2$, 6 wt. % MnO$_2$, 64 wt. %; particulate graphite (expanded graphite from Timcal Group), 27 wt. %; tetrafluoroethylene (Teflon) binder, 3 wt. %. The MnO$_2$ was heat treated to remove residual water before use in the cathode. The cathode 70 can be prepared by mixing the above components in a conventional electric blender at room temperature until a homogenous mixture is obtained. The cathode mixture 70 can be coated on one side of the cathode current collector 15. The cathode current collector was a stainless steel expanded metal foil (EXMET stainless steel foil) having a basis weight of about 0.024 g/cm$^3$. The cathode composition is summarized as follows:

| Cathode Composition, wt. % | |
|---|---|
| AgCuO$_2$ | 6.0 |
| MnO2 | 64.0 |
| Tetrafluoroethylene Teflon polymer | 3.0 |
| Particulate graphite | 27.0 |
| Total | 100.0 |

Fresh cells 10 were discharged at a constant current of 3 milliAmp and 10 milliAmp to a cut off of 1.5 volts. The cells cathode active material's specific capacity (mAmp-hours/g), energy output (mWatt-hours/g), and energy density (mWatt-hours/cc) is reported in Table 1 for discharge at 3 milliamp and Table 2 for discharge at 10 milliamp.

EXAMPLE 6

Lithium Anode/AgCuO$_2$+MnO$_2$ Cathode

A button cell 10 is made as in Example 1 employing the same size cell, same anode, same electrolyte and components, except that the cathode composition was changed to employ AgCuO$_2$ in admixture with MnO$_2$ as cathode active material.

Cathode 70 has the following formulation: AgCuO$_2$, 10 wt. % MnO$_2$, 60 wt. %; particulate graphite (expanded graphite from Timcal Group), 27 wt. %; tetrafluoroethylene (Teflon) binder, 3 wt. %. The MnO$_2$ was heat treated to remove residual water before use in the cathode. The cathode 70 can be prepared by mixing the above components in a conventional electric blender at room temperature until a homogenous mixture is obtained. The cathode mixture 70 can be coated on one side of the cathode current collector 15. The cathode current collector was a stainless steel expanded metal foil (EXMET stainless steel foil) having a basis weight of about 0.024 g/cm$^3$. The cathode composition is summarized as follows:

| Cathode Composition, wt. % | |
|---|---|
| AgCuO$_2$ | 10.0 |
| MnO2 | 60.0 |
| Tetrafluoroethylene Teflon polymer | 3.0 |
| Particulate graphite | 27.0 |
| Total | 100.0 |

Fresh cells 10 were discharged at a constant current of 3 milliAmp and 10 milliAmp to a cut off of 1.5 volts. The cells cathode active material's specific capacity (mAmp-hours/g), energy output (mWatt-hours/g), and energy density (mWatt-hours/cc) is reported in Table 1 for discharge at 3 milliamp and Table 2 for discharge at 10 milliamp.

TABLE 1

Lithium Button Cell With Cathode Comprising
$AgCuO_2$ or $Ag_2Cu_2O_3$ Discharged at 3 mAmp. to 1.5 V cut-off

| Example | Cathode Actives (Weight %) | Specific Capacity for Total Cathode Actives (mAh/g) | Energy Out of Total Cathode Actives (mWh/g) | Energy out of Total Cathode Actives, (mWh/cc) |
|---|---|---|---|---|
| Ex. 1 Comparison | $MnO_2$ (70 wt. %) | 253 | 667 | 3202 |
| Ex. 2 | $AgCuO_2$ (70 wt. %) | 367 | 717 | 5091 |
| Ex. 3 | $Ag_2Cu_2O_3$ (70 wt. %) | 266 | 526 | 3682 |
| Ex. 4 | $AgCuO2$ (3 wt. %); $MnO_2$ (67 wt. %) | 267 | 697 | 3346 |
| Ex. 5 | $AgCuO2$ (6 wt. %); $MnO2$ (64 wt. %) | 285 | 736 | 3533 |
| Ex. 6 | $AgCuO2$ (10 wt. %); $MnO2$ (60 wt. %) | 281 | 701 | 3365 |

TABLE 2

Lithium Button Cell With Cathode Comprising
$AgCuO_2$ or $Ag_2Cu_2O_3$ Discharged at 10 mAmp., to 1.5 V cut-off.

| Example | Cathode Actives (% by wt.) | Specific Capacity for cathode actives (mAh/g) | Energy Out for Total Cathode Actives (mWh/g) | Energy Out of Total Cathode Actives (mWh/cc) |
|---|---|---|---|---|
| Ex. 1 Comparison | $MnO_2$ (70 wt. %) | 209 | 540 | 2592 |
| Ex. 2 | $AgCuO_2$ (70 wt. %) | 301 | 545 | 3870 |
| Ex. 3 | $Ag_2Cu_2O_3$ (70 wt. %) | 227 | 423 | 2961 |
| Ex. 4 | $AgCuO_2$ (3 wt. %); $MnO_2$ (67 wt. %) | 212 | 525 | 2520 |
| Ex. 5 | $AgCuO_2$ (6 wt. %); $MnO_2$ (64 wt. %) | 243 | 601 | 2885 |
| Ex. 6 | $AgCuO_2$ (10 wt. %); $MnO_2$ (60 wt. %) | 230 | 553 | 2654 |

The test lithium cells employing cathodes comprising mixtures of $AgCuO_2$ and $MnO_2$ or mixtures of $Ag_2Cu_2O_3$ and $MnO_2$ show generally higher actual specific capacity (mAmp-hrs/g of total cathode actives) and higher energy output (mWatt-hr per gram or mWatt-hr per cubic centimeter of total cathode actives) than the comparative lithium cells with only $MnO_2$ actives. This was generally true at both discharge rates employed 3 mAmp (Table 1) or 10 mAmp rate (Table 2). However, a few data points fell below the comparative. They were at higher rate of 10 mAmp at Example 3 ($Ag_2Cu_2O_3$ without $MnO_2$) for energy output in mWh/g and Example 4 (3 wt. % $AgCuO_2$ and 67 wt % $MnO_2$) for energy output in mWh/g or mWh/cm$^3$. At low rate of 3 mAmp at Example 3 ($Ag_2Cu_2O_3$ without MnO2) the energy output in mWh/g fell below the comparative.

Although the present invention has been described with reference to specific embodiments, it will be appreciated that variations within the concept of the invention are possible. Thus, the invention is not intended to be limited to the specific embodiments, but rather is defined by the claims and equivalents thereof.

What is claimed is:

1. An electrochemical cell comprising a housing, a positive terminal, a negative terminal, an anode comprising lithium, a nonaqueous electrolyte and a cathode comprising a first cathode active material comprising manganese dioxide and a second cathode active material selected from the group consisting of $AgCuO_2$, $Ag_2Cu_2O_3$ and mixtures thereof;

wherein the second cathode active material selected from the group consisting of $AgCuO_2$, $Ag_2Cu_2O_3$ and mixtures thereof comprises between about 1–20 percent by weight of the cathode.

2. The cell of claim 1 wherein said cell is nonrechargeable.

3. The cell of claim 1 wherein said first cathode active material comprising manganese dioxide is heat treated to remove water therefrom.

4. The cell of claim 1 wherein said cathode further comprises a conductive carbon comprising graphite.

5. An electrochemical cell comprising a housing, a positive and a negative terminal, an anode comprising lithium, a cathode comprising $AgCuO_2$, and a nonaqueous electrolyte.

6. The cell of claim 5 wherein the cell is nonrechargeable.

7. The cell of claim 5 wherein said cathode further comprises a manganese dioxide.

8. The cell of claim 7 wherein the $AgCuO_2$ comprises between about 1 and 20 percent by weight of cathode.

9. The cell of claim 5 wherein said cathode further comprises manganese dioxide heat treated to remove water therefrom.

10. The cell of claim 5 wherein said cathode further comprises a lithiated manganese dioxide.

11. The cell of claim 5 wherein said cathode further comprises a conductive carbon comprising graphite.

12. An electrochemical cell comprising a housing, a positive terminal, a negative terminal, an anode comprising lithium, a cathode comprising manganese dioxide and $Ag_2Cu_2O_3$, and a nonaqueous electrolyte;

wherein the $Ag_2Cu_2O_3$ comprises between about 1–20 percent by weight of the cathode.

13. The cell of claim 12 wherein said cell is nonrechargeable.

14. The cell of claim 12 wherein said manganese dioxide is heat treated to remove water therefrom.

15. The cell of claim 12 wherein said manganese dioxide is a lithiated manganese dioxide.

16. The cell of claim 12 wherein said cathode further comprises a conductive carbon comprising graphite.

* * * * *